Patented Dec. 7, 1948

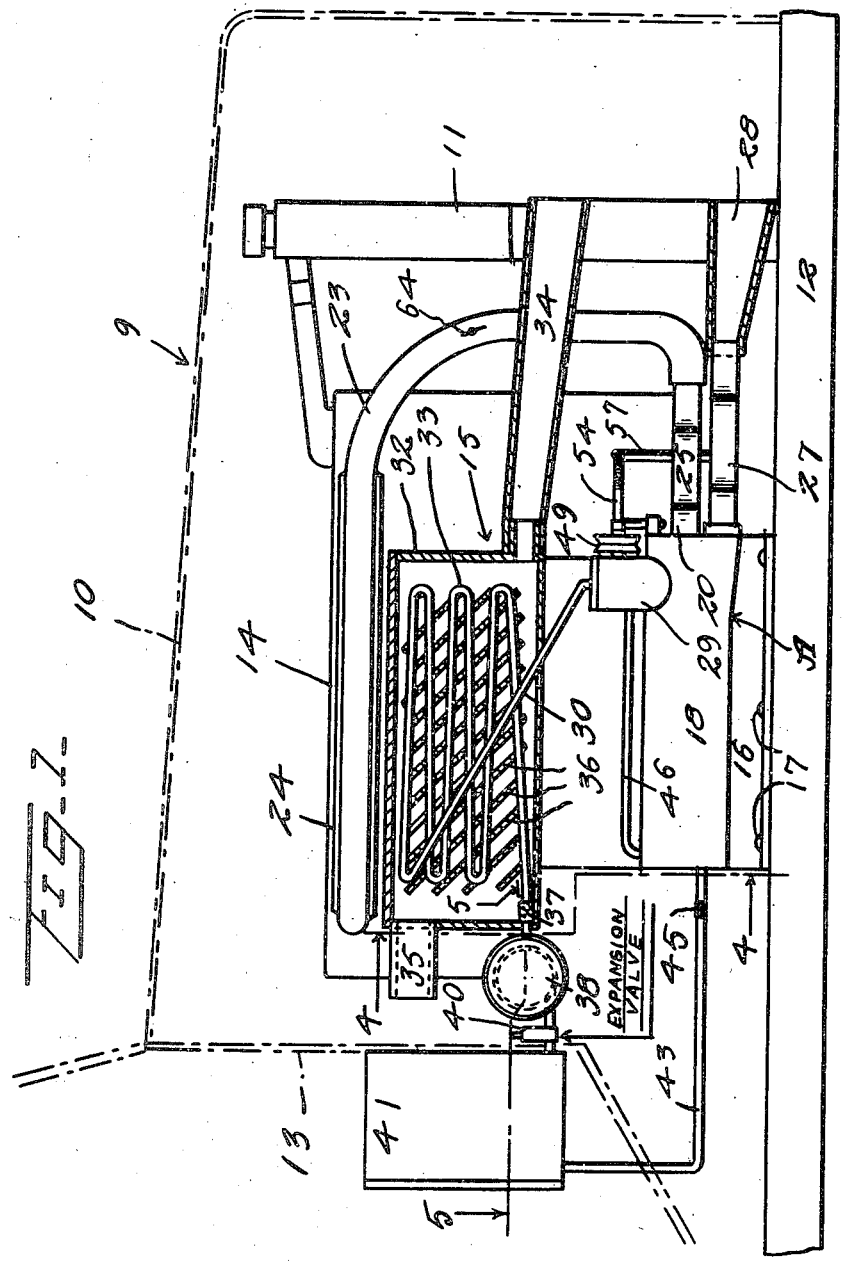

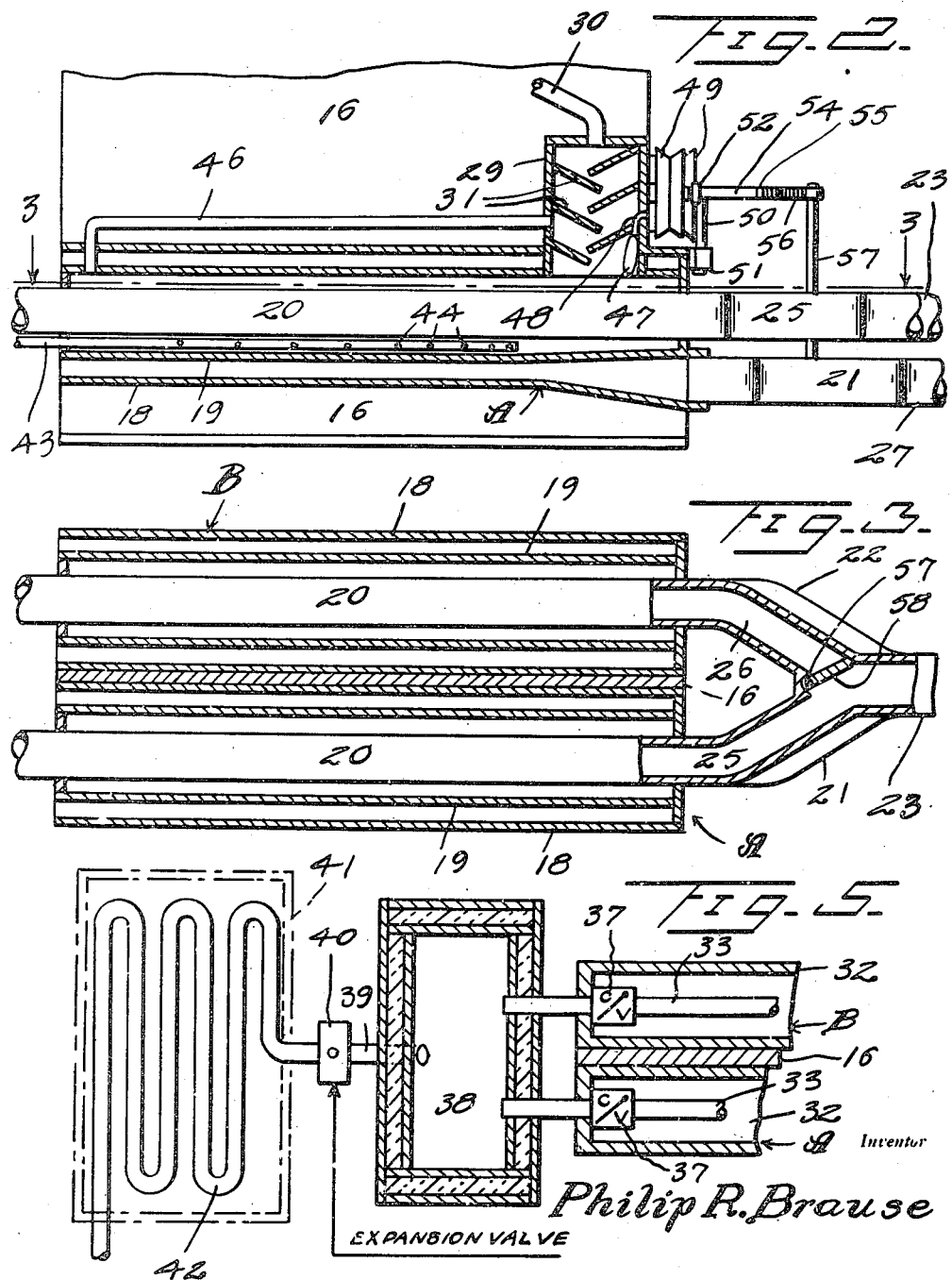

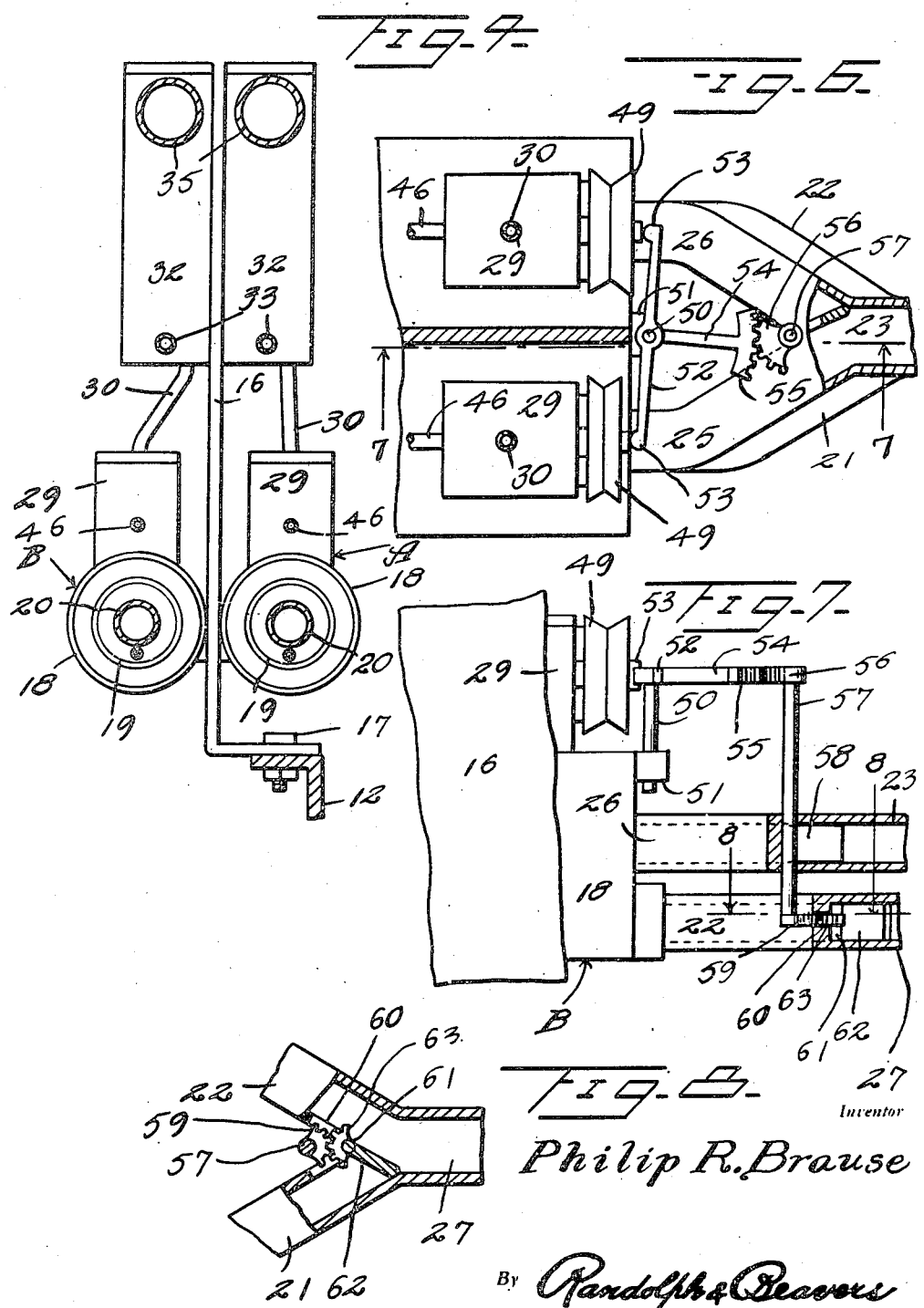

2,455,401

UNITED STATES PATENT OFFICE 2,455,401

REFRIGERATING UNIT FOR VEHICLES

Philip R. Brause, Casper, Wyo.

Application September 27, 1946, Serial No. 699,795

9 Claims. (Cl. 62—5)

This invention relates to a refrigerating unit for use with motor vehicles and which is constructed and arranged to be operated by heat generated by the prime mover of the vehicle and by cold air directed through the vehicle, by the forward motion thereof for operating a refrigerating system for either cooling the interior of the vehicle or for cooling refrigerator boxes carried therein.

More particularly, it is an object of the invention to provide an improved refrigerating system of simple construction wherein the majority of the system is composed of duplicate sections which through a simple control arrangement are operated alternately for maintaining a supply of a refrigerant available to be admitted to the refrigerating unit of the system.

Various other objects and advantages of the invention will hereinafter become more fully apparent from the following description of the drawings, illustrating a preferred embodiment of the invention, and wherein:

Figure 1 is a side elevational view, partly in longitudinal section, showing a preferred embodiment of the invention applied to a motor vehicle;

Figure 2 is an enlarged longitudinal sectional view, partly in side elevation, of a portion of one of the absorbers of the system;

Figure 3 is a horizontal sectional view through the two absorbers, taken substantially along a plane as indicated by the line 3—3 of Figure 2;

Figure 4 is a transverse vertical sectional view, taken substantially along a plane as indicated by the line 4—4 of Figure 1;

Figure 5 is a longitudinal, horizontal sectional view, taken substantially along a plane as indicated by the line 5—5 of Figure 1;

Figure 6 is a fragmentary top plan view, partly in horizontal section of a portion of the system;

Figure 7 is a longitudinal, vertical sectional view, taken substantially along a plane as indicated by the line 7—7 of Figure 6;

Figure 8 is a horizontal sectional view taken substantially along a plane as indicated by the line 8—8 of Figure 7.

Referring more specifically to the drawings, 9 designates generally the forward portion of a motor vehicle including the hood 10, radiator 11, a portion of the chassis 12, and a part of the cab or interior of the vehicle, designated 13. Beneath the hood 10 is disposed the prime mover or internal combustion engine 14 of the vehicle.

The refrigerating system, designated generally 15, is supported at one side of the engine 14 but beneath the hood 10, by an upright, longitudinally disposed plate or wall 16 which is secured by fastenings 17 to a portion of the frame of the chassis 12, as seen in Figures 1 and 4.

The plate 16 provides a support for a pair of longitudinally disposed conduits 18, one of which is mounted on each side of the plate 16, and one of which forms a part of a section A of the refrigerating system 15 and the other of which forms a part of a corresponding section B thereof. An absorption tube 19 is mounted in each of the conduits 18 and concentric thereto and spaced from the wall thereof and a conduit 20 is similarly disposed within each of the absorption tubes 19.

As best seen in Figures 2 and 3, the absorption tubes 19 are closed at both ends thereof except for openings in the ends through which the conduits 20 extend and the conduits 18 are open at their rear ends and are provided with restricted conduits 21 and 22 which open into the forward ends thereof, and which forward ends are otherwise closed.

As best seen in Figure 1, a pipe or conduit 23 communicates at one end thereof with the exhaust manifold 24 of the engine 14 and may be provided with a flexible section to form the connection therewith to permit relative vibration of the engine 14 and its exhaust manifold 24 relatively to the conduit 23. The conduit 23 is provided with a bifurcated or forked opposite end, the two legs or furcations 25 and 26 of which merge with the forward ends of the conduits 20 of the sections A and B, as clearly illustrated in Figure 3. The conduits 20 extend longitudinally through the absorber tubes 19 and rearwardly thereof they merge and connect with the exhaust pipe of the engine 14, not shown. The conduits 21 and 22 likewise form legs or furcations of a bifurcated end of a pipe 27 which extends forwardly from said furcations, and which is provided with a flared forward end or extension 28, as seen in Figure 1, which opens outwardly of the forward side of the radiator 11, for a purpose which will hereinafter become apparent.

A dome 29 rises from each of the absorber tubes 19, adjacent their forward ends; said domes extending through the conduits 18 and having lower open ends connected to the absorption tubes 19 and upper ends which are closed except for a pipe 30 which extends upwardly from each of said domes 29. The domes 29 contain downwardly and inwardly inclined baffles 31, for a purpose which will hereinafter be described.

An elongated container 32 is disposed on each side of the wall 16 and above each of the domes 29, one of said containers 32, forming a part of each of the sections A and B. The containers 32 form the housings of condensers and each contain a conduit 33, as seen in Figure 1, which is lapped longitudinally therethrough and one end of which merges with the opposite end of the complementary pipe 30 and at the upper end of the lapped conduit 33. Each of the containers or housings 32 is provided with a pipe or passage 34 projecting forwardly therefrom and which opens outwardly of the forward part of the radiator 11 and which communicates with its housing 32 at the forward end and adjacent the bottom thereof. Each of the housings 32 is also provided with an outlet 35 at its rear end and adjacent the top thereof and is also provided with a plurality of internally disposed baffles 36 which are inclined upwardly and rearwardly and through which the lapped conduit 33 extends, for a purpose which will hereinafter become apparent.

The opposite end of each lapped conduit 33 is provided with a check valve 37 and therebeyond extends through the rear wall of its housing 32 and opens into an insulated storage tank or reservoir 38, as best seen in Figure 5. The reservoir 38 is common to both system sections A and B and is provided with an outlet conduit 39 containing an expansion valve 40 and which extends through the dashboard of the vehicle 9 and into a refrigerator box 41 disposed in the passenger compartment 13 or which could be located in any desired part of the vehicle 9 as for example in a truck body thereof and which may be of any desired size. The conduit 39 merges with a cooling coil 42 in the refrigerator box 41 at the inlet end thereof and said coil has an opposite outlet end connected to two pipes or conduits 43, one of which forms a part of each of the unit sections A and B. The pipes 43 extend longitudinally into the absorber tubes 19 and the portions thereof disposed therein are provided with a plurality of apertures 44, as seen in Figure 2. The pipes 43 are provided with check valves 45, located therein between the refrigerator box 41 and the absorber tubes 19, for a purpose which will hereinafter be described. As seen in Figure 2, a tube or pipe 46 connects each of the absorption tubes 19, adjacent its rear end to the interior of its dome 29, intermediate of the top and bottom thereof.

A thermostat bulb 47, as seen in Figure 2, is mounted in communication with each of the absorption tubes 19 and is connected by a conduit 48 to a bellows 49 which is located on the outer side of each dome 29. As best seen in Figures 6 and 7, a shaft 50 is journaled in an upright position in a bearing 51 which is secured to the forward edge of the wall 16. A lever 52 is mounted on the shaft 50, intermediate of the ends thereof and said lever is provided with end portions 53, one of which is adapted to bear against each of the bellows 49, as best seen in Figure 6. The lever 52 is also provided with an arm 54 which projects at right angles therefrom and which is formed integral with the intermediate, pivoted portion thereof. The lever arm 54 is provided with an arcuate rack 55 at its outer end, which meshes with a gear segment 56 keyed to the upper end of a shaft 57. The shaft 57 extends through and is journaled in the apex portion of the conduit furcations 25 and 26, as best seen in Figure 3 and has a gate valve 58 projecting laterally therefrom and which is sized and shaped to close the entrance end of either the conduit furcation 25 or the conduit furcation 26. The lower end of the shaft 57 is disposed between the forked conduit portions 21 and 22 and has a gear segment 59 keyed thereto and projecting laterally therefrom and which extends into a slot 60 in the apex of the conduit portions 21 and 22. A shaft 61 is journaled in said apex portion and has a gate valve 62 projecting laterally from one side thereof and a gear segment 63 projecting from its opposite side and disposed to mesh with the gear segment 59 in the slot 60. The gate 62 is constructed and arranged to close the entrance end of either the conduit 21 or the conduit 22 and from a consideration of Figures 6, 7 and 8, it will be readily apparent that when the shaft 57 is rotated, the gate valves 58 and 62 will swing in opposite directions so that when the gate valve 62 is closing the conduit 21, the gate valve 58 will be in a position to close the conduit 26, as illustrated in Figures 8 and 6, or conversely.

The conduit 23 is preferably provided with a shut-off valves 64, as seen in Figure 1, which may be connected to suitable pressure control means, not shown, located to be actuated by a pressure in the tank or reservoir 38 for closing the passage through the conduit 23.

Assuming that the system 15 contains a refrigerant, not shown, such as ammonia and that the vehicle 9 is in motion and further assuming that the gate valves are in the position as illustrated in Figures 6 and 8, with the parts thus disposed, cold air will enter through the passages 27 and 28 and be deflected by the gate valve 62 into the passage 22 and around absorption tube 19 of the section B. At the same time, a part of the exhaust gases from the manifold 24 will pass through the conduit 23 and be deflected by the gate valve 58 into and through the passage 25 to and through the conduit 20 of the section A, so that the absorption tube of the section A will be heated and the absorption tube of the section B will be cooled. The refrigerant contained in the absorption tube 19 of the section A will be vaporized by the heat passing through the conduit 20 thereof and in vaporous form will pass upwardly through the dome 29 of the section A either directly or through the pipe 46 thereof and out through the pipe 30 into the condenser pipe 33 of section A. While this is occurring, the valve 45, disposed in the pipe 43 of section A will be closed by the pressure of the vaporous refrigerant to prevent said refrigerant from flowing back toward the refrigerator box 41. The refrigerant entering the coil 33 of the section A will be condensed and liquified by the cold air entering through the inlet 34 and passing upwardly and around the coil 33 as thus deflected by the baffles 36. The condensed and liquified refrigerant will flow past the check valve 37 and into the reservoir 38. This refrigerant or refrigerant already stored in the reservoir 38 will flow past the expansion valve 40 and into the cooling coil 42 wherein it will absorb heat and be vaporized, for cooling the refrigerator box 41. As this is occurring, the vaporized refrigerant in the coil 42 will flow through the pipe 42 of the section B past its valve 45 and will be released therefrom through the apertures 44 into the absorption tube 19 of the section B. The cold air passing around the absorption tube 19 of the section B and through the tube 18, will tend to chill said absorption tube for condensing and liquifying the refrigerant contained therein, thus lowering the pressure in the system, so that evaporation can occur in the refrigerator box 41. As each thermostat bulb 47 is located in the region of heat concentration, the bulb 47 of the section A will be expanded by the heated vapor passing upwardly through the dome 29 thereof until its associated bellows 49 is expanded to rock the lever 52 in a counterclockwise direction, as seen in Figure 6 to contract the bellows 49 of the section B. When this occurs, the gate valve 58 will move to a position to close the passage 25 and open the passage 26 when the gate valve 62 will be swung to a position to close the passage 22 and open the passage 21, so that cold air will be admitted to the absorption tube 19 of the section A and heat to the absorption tube 19 of the section B to thus reverse the operation of the system. It will thus be readily apparent that each of the system sections A and B will operate intermittently by being subjected to heat for vaporizing the refrigerant in the absorption tube thereof to cause the refrigerant to be conveyed through the condenser and back to the storage tank 38 in a liquified form or will be chilled for lowering the pressure in the system to permit the vaporized refrigerant to flow thereto from the refrigerating coil 42, so that a low pressure region will be constantly maintained to receive the refrigerant from the coil of the refrigerating unit 41 and at the same time a high pressure region will be maintained in the other section of the system for forcing refrigerant through a condenser to be cooled and liquified and supplied to the reservoir.

The baffles 31 and the dome 29 are provided in order that any water vapor passing upwardly therethrough can condense thereon and return to the absorption tube 19, disposed therebeneath.

It will also be noted that the absorption tubes 19 are located at the lowermost points of the systems, so that the refrigerant will readily flow thereto, while the condensers are disposed at the highest points of the systems, where the refrigerant can be received under pressure after being vaporized and from which the refrigerant after being condensed and liquified will readily flow to the reservoirs 38.

Obviously, a hot water conduit connected to the water jacket of the engine 14 could be utilized for intermittently heating the absorption tubes 19 in lieu of utilizing the heat from the exhaust gases and various other modifications and changes are contemplated and may obviously be resorted to, without departing from the spirit and scope of the invention as hereinafter defined by the appended claims.

I claim:

1. In a refrigerating system for motor vehicles, a refrigerator box adapted to be mounted in a portion of the vehicle to be cooled and containing a cooling coil, a reservoir adapted to contain a condensed refrigerant and connected to one end of said cooling coil for supplying the refrigerant thereto, said system being provided with a pair of absorption units, automatically controlled means for alternately heating and cooling said absorption units, condensers disposed above each of the absorption units and in fluid communication therewith, said condensers being connected to said reservoir for supplying the condensed refrigerant thereto, and conduits, provided with check valves, connecting the cooling coil of the refrigerator box to said absorption units for supplying the vaporized refrigerant to the absorption unit being cooled and in which a low pressure area of the system exists, said absorption units being intermittently heated for vaporizing the condensed refrigerant therein for causing the refrigerant to be forced therefrom to the condenser which is connected thereto.

2. A refrigerating system as in claim 1, said absorption units being disposed at the lowermost points of the system to facilitate the flow of the refrigerant thereto from the cooling coil.

3. A refrigerating system as in claim 1, said absorption units being disposed at the lowermost points of the system to facilitate the flow of the refrigerant thereto from the cooling coil, and the condensers being disposed at the highest point of the system, whereby the condensed refrigerant therefrom will flow to the reservoir.

4. A refrigerating system as in claim 1, and heat responsive means for regulating the flow of a heating medium and a cooling medium to the absorption units whereby when the cooling medium is directed to one of the absorption units, the heating medium will be directed to the other absorption unit or conversely.

5. A refrigerating system as in claim 1, a cooling medium comprising air, a conduit for conveying air to each of the absorption units, said conduit having a common inlet end opening toward the forward end of the vehicle and adapted to receive air directed therethrough by the forward motion of the vehicle.

6. A refrigerating system as in claim 1, a heating medium supplied from the dissipated heat of the prime mover of the vehicle, a conduit for the heating medium extending from a portion of said prime mover and having a bifurcated portion, one furcation of which extends through each of the absorption units, a cooling medium comprising air, a conduit for the cooling medium having an open forward end, opening forwardly of the vehicle, said air conduit having a bifurcated portion including a furcation disposed around each of the absorption units.

7. A refrigerating system as in claim 1, a heating medium supplied from the dissipated heat of the prime mover of the vehicle, a conduit for the heating medium extending from a portion of said prime mover and having a bifurcated portion, one furcation of which extends through each of the absorption units, a cooling medium comprising air, a conduit for the cooling medium having an open forward end, opening forwardly of the vehicle and through which air is forced by the forward motion of the vehicle, said air conduit having a bifurcated portion including a furcation disposed around each of the absorption units, and valve means for the heating medium and cooling medium located in the conduits thereof and constructed and arranged whereby when the heating medium is directed to one of the absorption units, the cooling medium will be directed to the other absorption unit.

8. A refrigerating system as in claim 1, a heating medium supplied from the dissipated heat of the prime mover of the vehicle, a conduit for the heating medium extending from a portion of said prime mover and having a bifurcated portion, one furcation of which extends through each of the absorption units, a cooling medium comprising air, a conduit for the cooling medium having an open forward end, opening forwardly of the vehicle and through which air is forced by the forward motion of the vehicle, said air conducit having a bifurcated portion including a furcation disposed around each of the absorption units, and valve means for the heating medium and cooling medium located in the conduits thereof and constructed and arranged whereby when the heating medium is directed to one of the absorption units, the cooling medium will be directed to the other absorption unit, and a heat responsive means for simultaneously actuating said valve for reversing the position thereof.

9. In a refrigerating system for motor vehicles, a condenser adapted to be mounted on a motor vehicle and at a high point of the refrigerating system, means for supplying air to said condenser in response to the forward motion of the vehicle for condensing a refrigerant passing through the condenser, a reservoir connected to the condenser and to which the refrigerant is conveyed by gravity in a condensed form, a refrigerant box having a cooling coil connected at one end thereof to the outlet of said reservoir for receiving the condensed refrigerating medium therefrom, expansion valve means for regulating the flow of the refrigerant to the cooling coil, an absorption unit disposed at the low point of the refrigerating system, a conduit for conveying the vaporized refrigerant, after absorption of heat in the refrigerator box, from the cooling coil to the absorption unit, check valve means for preventing a reverse flow of the refrigerant from the absorption unit toward the cooling coil, and automatically operated means for alternately chilling and heating said absorption unit whereby when the absorption unit is chilled a region of low pressure will be created therein to cause the vaporized refrigerant to flow thereto and so that when the absorption unit is subsequently heated, the refrigerant therein will be vaporized, and a conduit connecting the absorption unit to the condenser for conveying the vaporized refrigerant from the absorption unit back to the condenser.

PHILIP R. BRAUSE.

REFERENCES CITED

The following references are of record in the file of this patent:

UNITED STATES PATENTS

| Number | Name | Date |
| --- | --- | --- |
| 1,774,820 | Williams | Sept. 2, 1920 |
| 1,923,451 | Miller | Aug. 22, 1933 |
| 2,068,333 | Krummell | Jan. 19, 1937 |